United States Patent [19]
Batey

[11] Patent Number: 5,670,724
[45] Date of Patent: Sep. 23, 1997

[54] APPARATUS FOR SENSING LIQUID FLOW AND PRESSURE IN A CONDUIT AND ASSOCIATED METHODS

[75] Inventor: Robert H. Batey, Apollo Beach, Fla.

[73] Assignee: AMJ Equipment Corporation, Lakeland, Fla.

[21] Appl. No.: 641,614

[22] Filed: May 1, 1996

[51] Int. Cl.$^6$ ............................................. G01F 1/58
[52] U.S. Cl. ........................... 73/861.12; 73/861.15
[58] Field of Search ..................... 73/861.12, 861.11, 73/861.15

[56] References Cited

U.S. PATENT DOCUMENTS

| | | | |
|---|---|---|---|
| 3,094,000 | 6/1963 | Kass | 73/194 |
| 3,503,258 | 3/1970 | Baker | 73/194 |
| 3,620,079 | 11/1971 | Nosley | 73/194 EM |
| 3,834,232 | 9/1974 | Gruner et al. | 73/194 EM |
| 3,881,350 | 5/1975 | Nosley | 73/194 EM |
| 3,929,016 | 12/1975 | Takeuchi et al. | 73/194 EM |
| 4,122,714 | 10/1978 | Kobayashi et al. | 73/194 EM |
| 4,181,018 | 1/1980 | Schmoock | 73/194 EM |
| 4,261,210 | 4/1981 | Gardner | 73/861.12 |
| 4,290,312 | 9/1981 | Kobayashi | 73/861.12 |
| 4,409,846 | 10/1983 | Ueno | 73/861.17 |
| 4,459,858 | 7/1984 | Marsh | 73/861.12 |
| 4,774,844 | 10/1988 | Davis | 73/861.12 |
| 4,920,795 | 5/1990 | Codazzi et al. | 73/195 |
| 5,125,276 | 6/1992 | Wada | 73/861.12 |
| 5,275,059 | 1/1994 | Lew et al. | 73/861.15 |
| 5,307,688 | 5/1994 | Lefebvre | 73/861.16 |
| 5,390,548 | 2/1995 | Kasper et al. | 73/861.15 |
| 5,398,552 | 3/1995 | Marsh | 73/861.12 |
| 5,417,118 | 5/1995 | Lew et al. | 73/861.12 |
| 5,544,532 | 8/1996 | Brown | 73/861.16 |
| 5,551,306 | 9/1996 | Scarpa | 73/861.16 |

FOREIGN PATENT DOCUMENTS

| | | | |
|---|---|---|---|
| 2814-853-1A | 11/1979 | Germany | G01F 1/52 |
| 57-1915 A | 1/1982 | Japan | G01F 1/58 |

OTHER PUBLICATIONS

Turbo Instruments, Inc., Publ. No. TB 2301–202/0494/E, "Insertion Magnetic Flow Sensor MIS 2", pp. 1–7.

Turbo Instruments, Inc., Publ. No. TB MG 711/E u. MG 911/E, "Magnetic Flow Sensor Type MG 711/E Type MG 911/E", pp. 1–6.

*Primary Examiner*—Richard Chilcot
*Assistant Examiner*—Jewel V. Artis
*Attorney, Agent, or Firm*—Allen, Dyer, Doppelt, Milbrath & Gilchrist, P.A.

[57] ABSTRACT

A sensor for liquid flow rate and liquid pressure includes a housing, in turn, including a liquid contacting portion positioned within a liquid carrying conduit. The liquid contacting portion includes a pressure responsive diaphragm. An electromagnetic coil is positioned in the housing for generating a magnetic field within the flow of liquid, and a pair of spaced apart electrodes are exposed on the liquid contacting portion for generating a signal related to the liquid flow rate. A pressure sensing device or mechanism, such as a gauge or transducer, may be operatively coupled to the diaphragm. Accordingly, a compact and reliable sensor for both liquid flow rate and liquid pressure is provided by the present invention. In one embodiment the conduit may have a cylindrical shape with a circular cross-section and in another embodiment, the conduit may be an open channel conduit. Method aspects of the invention are also disclosed.

45 Claims, 5 Drawing Sheets

APPARATUS FOR SENSING LIQUID FLOW AND PRESSURE IN A CONDUIT AND ASSOCIATED METHODS

FIELD OF THE INVENTION

The present invention relates to the field of sensors, and, more particularly, to a sensing apparatus for liquid flow.

BACKGROUND OF THE INVENTION

A magnetic or electromagnetic liquid flow sensor is commonly used for determining the flow rate or volumetric flow of a conductive liquid or media, such as fresh water or waste water, for example, flowing within a conduit. A magnetic flow sensor operates in accordance with Faraday's Law which provides that a moving conductor in a magnetic field generates a voltage, the amplitude of which is proportional to the velocity of the conductor. For a magnetic flowmeter, the moving conductor is the liquid or media flowing adjacent the flowmeter.

There are two general types of conventional magnetic flow sensors or flowmeters each with its own shortcomings. A first type of magnetic flowmeter includes two opposing electromagnetic coils positioned outside and immediately adjacent a non-ferrous conduit or spool piece. The magnets generate a magnetic field through the media passing through the non-ferrous spool piece, while the moving media generates a small electrical voltage between a pair of spaced apart electrodes extending into the spool piece and contacting the media. The electromagnets are typically energized with a bipolar waveform of relatively low frequency, and the output voltage of the electrodes is converted by an electrical circuit into a desired analog or digital signal representing the flow rate. The energizing of coils and processing of the voltage signal is typically performed in a remote or integrally mounted converter.

Conventional magnetic flow meters normally operate with a magnetizing current of typically 100–200 milliamps peak-to-peak, at a frequency of typically about 5 Hz and at typical bipolar voltage of 20–30 Volts. This normally provides a magnetic field strength which allows the velocity measured at the electrodes to be sufficiently weighted to represent volumetric flow with acceptable accuracy. However, the coils must be of substantial size such that the magnetic field covers the complete or substantial area of the cross-section of the conduit or spool piece. In many cases two relatively heavy coils are required to wrap substantially around the external circumference of the spool piece to provide a suitable magnetic field.

The spool piece of a conventional sensor is typically manufactured from non-magnetic material, which is normally a non-magnetic stainless steel for strength and so that the distribution of the magnetic field is not disturbed. The complete internal diameter of the spool piece is electrically insulated with rubber, PTFE or a similar insulating material, with the electrodes virtually flush with the circular spool piece internal diameter. The need for an electrically insulating liner increases the expense of the flowmeter and, more importantly, should the media penetrate the liner, electrical noise may overwhelm the relatively small output signal of the sensor.

The weight of the electromagnetic coils and the power consumption of typically greater than 10 VA has other major disadvantages. Namely the coils cannot be typically encapsulated in solid setting insulation material, since the temperature rise would be too excessive. Accordingly, shock or vibration applied to the sensor may result in significant movement of the coils relative to the conduit, resulting in change of calibration and/or inducing vibration errors.

Conventional sensors of the type having the coils on the outside of a non-magnetic spool piece of circular cross-section typically have no form of simple liquid velocity profile conditioning. Errors due to unconditioned irregular velocity profiles within the conduit are inherent in the flow sensing, unless a relatively expensive nozzle or venturi restriction is incorporated in the conduit.

A number of patent references disclose such conventional magnetic flowmeters or sensors with coils positioned external to the pipe through which the measured media is flowing. For example, U.S. Pat. No. 5,125,276 to Wada discloses a magnetic flowmeter including a plurality of coils surrounding a measuring pipe which, in turn, may be conducting and further include an electrically insulating lining. A magnetic casing surrounds the overall assembly. Along these lines, U.S. Pat. No. 4,920,795 to Codazzi et al. discloses a non-intrusive magnetic flowmeter sensor adjacent an insulated non-magnetic pipe through which a high pressure liquid flows. U.S. Pat. No. 4,409,846 to Ueno discloses a magnetic flowmeter including a non-conductive and non-magnetic pipe through which the liquid passes.

U.S. Pat. No. 4,290,312 to Kobayashi discloses a magnetic flowmeter also with an external coil. The flowmeter includes auxiliary electrodes mounted on the inner wall of the flow tube that are interconnected so that when the fluid ceases to be symmetrical, a potential difference is developed between the points which are short-circuited to cause the potential distribution in the tube to assume a distribution close to that encountered with a flow that is symmetrical thereby alleviating the error from the non-symmetrical fluid flow.

U.S. Pat. No. 3,620,079 Nosley discloses an embodiment of a flowmeter including a housing, a coil positioned within the housing, and a series of electrodes on the face of the housing. The electrodes are positioned within an imaginary cylinder defined by the interior of the coil. In other words, the electrodes are spaced relatively close and provide a relatively weak output signal that is susceptible to electrical noise. Similarly, published Japanese patent application no. 55-55475 to Wada discloses a flowmeter positioned in the opening of the wall of a pipe formed of magnetic material. The depth of extension of the flat outer face of the sensor into the pipe is relatively small given the relatively large diameter of the pipe. In other words, the spacing of the electrodes relating to the overall pipe diameter is also relatively small. Accordingly, the sensor may also be subject to electrical noise.

U.S. Pat. No. 4,181,018 to Schmoock discloses a flowmeter including a ferromagnetic ring within which a pair of electromagnets are supported. An annular pressure vessel is molded within the ring and encapsulates the coils, as well as a pair of opposing electrodes. U.S. Pat. No. 4,261,210 to Gardner discloses a flowmeter including an electromagnet formed of a plurality of stacked helically coiled conductive windings and wherein the electrodes are positioned on the face of the windings. Of further interest, U.S. Pat. No. 3,094,000 to Kass discloses a flowmeter including coils positioned external to the media carrying tube which, in turn, is lined with an insulating material. U.S. Pat. No. 3,881,350 to Nosley discloses a flowmeter for high pressure fluids, wherein a high pressure fluid is retained within an internal cavity to balance the high external pressure.

It may also be desirable to obtain a liquid flow rate measurement from an open channel conduit, that is, a conduit having sidewalls and a bottom, but which is open along the top. Relating to a flowmeter for open channel flow measurement, U.S. Pat. No. 3,929,016 to Takeuchi et al. discloses a tubular flowmeter mounted on a dam gate. U.S. Pat. No. 4,122,714 to Kobayashi et al. discloses a flowmeter for an open channel including a tube of insulation material positioned in the channel with its longitudinal axis normal to the direction of flow. German Patent No. 2,814,853 patent discloses flowmeter for an open channel including three electromagnets positioned around the open channel. Unfortunately, conventional sensors for an open channel may be inaccurate, especially where flow rates and liquid levels vary substantially.

A second type of flowmeter is an insertion magnetic flow sensor which includes a pair of electrodes and one or more coils in a single assembly. The sensor assembly is inserted through a media carrying conduit or tube which may be magnetic or non-magnetic. A representative insertion type sensor is manufactured by Turbo Instruments Inc. of Orinda Calif. under the designation MIS 2, for example. See also U.S. Pat. No. 4,459,858 to Marsh which also discloses an insertion type flowmeter.

Since both a small coil and a small relative distance between electrodes contribute to a low output signal strength confirmed by Faraday's Law, there is a resultant relatively low signal-to-noise ratio. Accordingly, an insertion sensor may be limited to use with relatively clean media of high conductivity and at relatively high velocities. Such a sensor is not typically sufficiently accurate and/or reliable to measure raw or filtered sewage or river water, whose high fat content or algae-type coatings of the electrodes reduces the effective electrical conductivity of the media.

A further disadvantage of the relatively small diameter conventional insertion sensors is their correspondingly low magnetic field strength. For this reason a conventional insertion flowmeter is normally inserted substantially into the liquid carrying conduit, typically with its electrodes situated at one-eighth of the pipe internal diameter to measure a realistic mean velocity to infer volumetric flow. Unfortunately, low velocities in large pipelines, pipe wall roughness, and unfavorable piping geometry may cause velocity profile irregularities. Then the ratio of the measured velocity at one eighth of the internal pipe diameter to the actual mean velocity representing true volumetric flow can cause unacceptable error. In addition, the necessary substantial insertion into the conduit causes sufficient disturbance of the flow media to further limit accuracy and repeatability. The insertion also limits the media or liquid to that having a relatively low viscosity and having no sizeable solids or wrap around streamers.

An insertion magnetic sensor for an open channel or non-full pipe flow measurement may be used with a level transducer. Unfortunately, such a configuration may also be inaccurate because of the relatively small distance between the electrodes compared to the size of the open channel or non-full pipe. The relatively low magnetic field strength and the frequency of energizing current often leads to an unacceptably low signal-to-noise ratio. Furthermore, the small size of a conventional insertion sensor does not typically allow accurate level sensing at the location of the electrodes, and thus requires more complex level sensing remote from the flow sensor.

Unfortunately, both types of conventional flowmeters or sensors operate at relatively low magnetizing currents and relatively low frequencies. In addition, noise is relatively high compared to the small signal voltages produced at the electrodes. Noise may be caused, for example, by coating of the electrodes or changes in the conductivity of the media, particularly where wastewater flow is being sensed. Anomalies of the velocity profile within the media carrying tube may also reduce the accuracy for conventional sensors. In addition, a conventional liquid flow sensor may require a separate pressure or level sensor in certain applications. It may be difficult to locate and mount such a pressure or level sensor near the liquid flow sensor thereby compromising the accuracy of the measurements.

SUMMARY OF THE INVENTION

In view of the foregoing background, it is therefore an object of the present invention to provide an apparatus and related method for accurately sensing a liquid flow rate and liquid pressure.

It is another object of the invention to provide an apparatus for sensing a liquid flow rate and liquid pressure that is readily manufactured and installed.

These and other objects, advantages and features of the present invention are provided by a liquid sensor comprising a housing including a liquid contacting portion which, in turn, includes a pressure responsive diaphragm; an electromagnetic coil is positioned in the housing for generating a magnetic field within the liquid flow; and a pair of spaced apart electrodes exposed on the liquid contacting portion for generating a signal related to the liquid flow rate. Liquid pressure sensing means is preferably operatively connected to the pressure responsive diaphragm for sensing liquid pressure.

The pressure sensing means may be provided by a transducer operatively connected to the pressure responsive diaphragm for generating a signal relating to liquid pressure. The pressure sensing means may also include indicator means for providing an indication of at least one of liquid pressure if the conduit is full, and liquid level if the conduit is less than full or has an open upper portion. The pressure sensing means may also further comprise cavity defining means for defining a cavity adjacent the pressure responsive diaphragm and within the housing. In addition, a fluid may be provided filling the cavity within the housing. For example, a standard pressure gauge may be connected in fluid communication with the cavity adjacent the pressure responsive diaphragm. Alternately, a transducer may deliver its output signal to a processor to facilitate computation of the volumetric liquid flow. Accordingly, a compact and reliable sensor for both liquid flow rate and liquid pressure is provided by the present invention.

In one embodiment the conduit may have a cylindrical shape with a circular cross-section. The liquid contacting portion of the liquid sensor may extend generally parallel to an axis of the conduit. In another embodiment, the conduit may have an open upper portion defining an open channel configuration.

The pressure responsive diaphragm may preferably be positioned between the pair of electrodes. The liquid contacting portion of the sensor housing may include an downwardly sloping annular portion surrounding an inner generally circular planar portion. The electrodes may be positioned adjacent opposite edges of the annular portion. In addition, the diaphragm may define at least a portion of the inner generally circular planar portion. The diaphragm in one embodiment may comprise an electrically conductive material so that the diaphragm serves as a ground electrode for the liquid flow rate portion of the sensor.

The liquid sensor may also comprise flux path means for defining a magnetic flux path from the coil and through adjacent portions of the conduit. The flux path means may preferably comprise a magnetically permeable core positioned within the electromagnetic coil. Moreover, the conduit preferably includes a magnetically permeable material so that the electromagnetic coil cooperates with the magnetically permeable material of the conduit to generate a strong magnetic field in the flow of liquid.

Yet another feature of the invention is that at least one additional sensor may extend into the interior of the conduit. The additional sensor may comprise one of a pH sensor, a salinity sensor, an oxidation reduction potential sensor, a dissolved oxygen sensor, and a turbidity sensor.

A method aspect according to the invention is for sensing liquid within a conduit of a type having an opening in a wall portion thereof. The method preferably comprises the steps of: positioning a liquid sensor in the opening in the conduit for sensing liquid flow rate and liquid pressure of liquid within the conduit, the liquid sensor comprising a liquid contacting portion including a pressure responsive diaphragm; generating a magnetic field from the liquid sensor and coupled to the liquid flow; and exposing a pair of spaced apart electrodes on the liquid contacting portion to the liquid flow to generate a signal related to liquid flow rate. The method also preferably further includes the step of generating a signal relating to liquid pressure based upon the pressure responsive diaphragm.

DETAILED DESCRIPTION OF PREFERRED EMBODIMENTS

Figure 1:
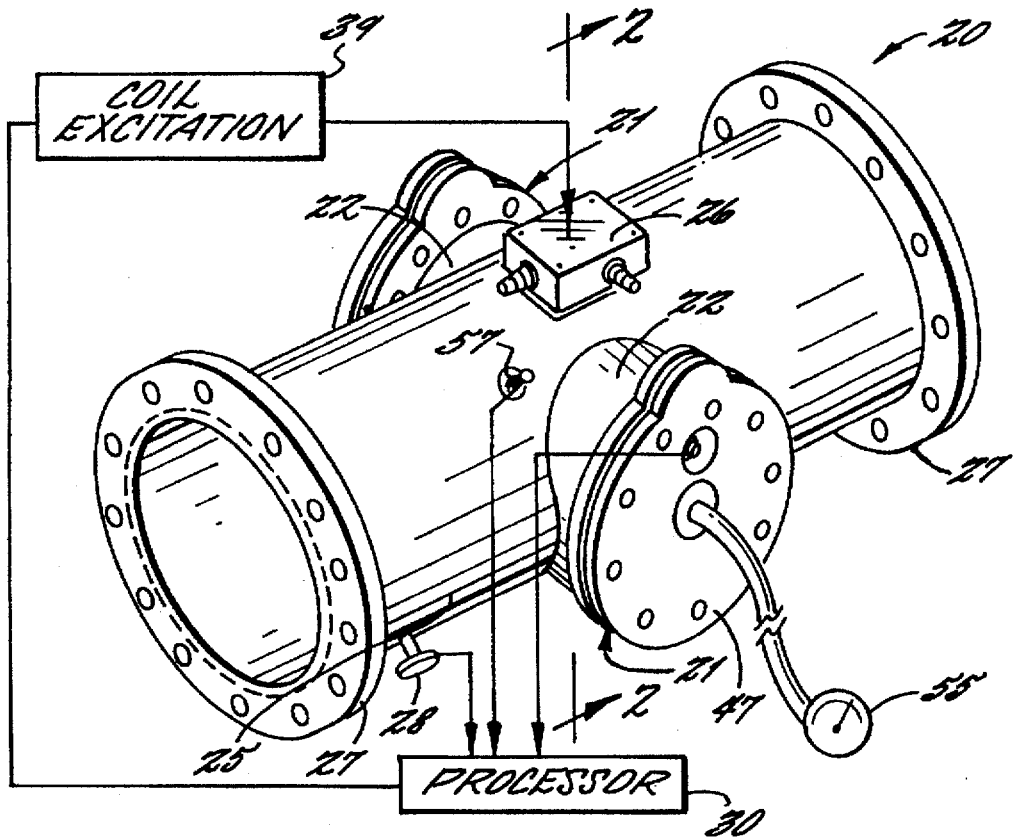
FIG. 1 is a perspective view of the apparatus in accordance with the invention.
Figure 2:
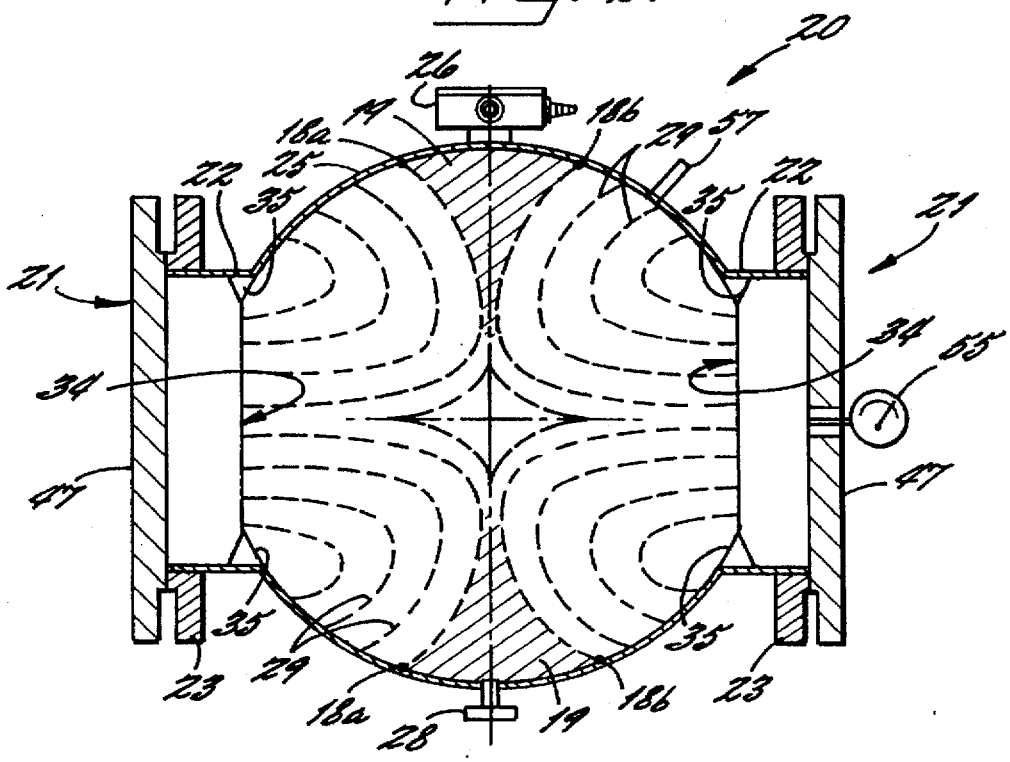
FIG. 2 is an enlarged cross-sectional view taken along lines 2—2 of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and double prime notation are used to indicate similar elements in alternative embodiments.

Referring to FIGS. 1–6, the sensing apparatus 20 according to the present invention is first described. The illustrated apparatus 20 includes a pair of opposing flow sensors 21, while for other applications a single sensor or multiple sensors may be used as would be readily understood by those skilled in the art. The sensors 21 may be installed in existing pipework, either directly or incorporating a conventional saddle of carbon steel, or which may be retro-fitted into an existing venturi differential pressure flowmeter to replace the venturi with improved flow rangeability and repeatability. For example, four sensors may be installed in a conduit.

The apparatus 20 includes a pair of flanged standpipes 22 connected to the media carrying tube or conduit 25. A pair of end flanges 27 are connected to the opposing longitudinal ends of the conduit 25. The end flanges 27 may be deleted in certain embodiment so that the conduit 25 ends are suitable for on-site mounting adapters, as would be readily understood by those skilled in the art. The conduit 25, standpipes 22 and end flanges 27 may preferably comprise a magnetically permeable material, such as carbon steel or other ferrous metals. Such materials are relatively strong and low cost compared to materials such as stainless steel, for example.

An electrical junction box 26 facilitates connections of the coils 32 of the flow sensors 21 to be connected in series and their electrodes 35 to be connected in parallel to improve the accuracy of liquid flow measurement, particularly for non-uniform velocity profiles within the conduit 25 as will be described in greater detail below. The coils 32 and electrodes 35 are connected to the schematically illustrated processor 30 and coil excitation means or circuit 39, the operation of which is also described in greater detail below.

The flow sensor 21 includes a housing 34 having a liquid contacting portion 37 and an electromagnetic coil 32 positioned within the housing. The housing 34, in turn, is positioned within the standpipe 22 so that the coil 32 produces relatively high magnetic fields, illustrated by the dotted field lines 29, in cooperation with the magnetically permeable conduit 25 and a central soft iron core 40 positioned within the coil 32. For example, the magnetic field of a large portion of the area adjacent the electrodes 35 and extending into the conduit 25 is preferably greater than about 10 milligauss. The relatively high strength magnetic field is projected into the flow of liquid and is subsequently attracted and bent towards the carbon steel sidewall of the conduit 25. The shape of the magnetic field represented by field lines 29 is desirably such that the media velocity sensed at the electrodes 35 represents the true weighted velocity to thereby accurately represent volumetric flow.

Carbon steel for the flanged standpipe 22, and conduit 25 allows completion of magnetic field when the sensor 21 is bolted together with the outer flange 47. Use of non-magnetic stainless steel as in a conventional sensor may not be as effective in producing the desirably high magnetic field. In other words, the carbon steel of the conduit 25 results in high density lines of magnetic flux being more efficiently and evenly distributed over the area of liquid flow. The geometry of the magnetic field is configured such that the measured velocity is more correctly weighted to represent true volumetric flow. This advantage is achieved even though the electrodes 35 are situated substantially flush with the internal diameter of the conduit 25. Consequently, media such as slurries or those carrying solids or streamers can be reliably measured and without substantially impeding flow. In addition, the sensor 21 may operate substantially unaffected by permanent high fat content sewage, algae or similar low conductivity coatings of the electrodes 35.

The flanged standpipe 22 preferably has a dimensional tolerance with the spool piece or conduit 25 such that the sensor 21 and outer flange 28 when assembled and bolted to a predetermined torque may be interchangeable on-site without change of calibration. In other words, the flanged standpipe 22 facilitates original installation and replacement so that the sensor 21 may inserted into the conduit to the desired correct depth.

The electromagnetic coil 32 when driven by the desired excitation can be made to produce little excess heat and, thus, may also be encapsulated by a potting compound or material 42 to thereby provide resistance to mechanical shock and vibration. The sensor 21 also requires only a relatively low number of coil windings in each coil 32 thereby permitting a substantial reduction in coil size and weight, while maintaining and delivering a sufficiently powerful magnetic field within the liquid.

Figure 5:
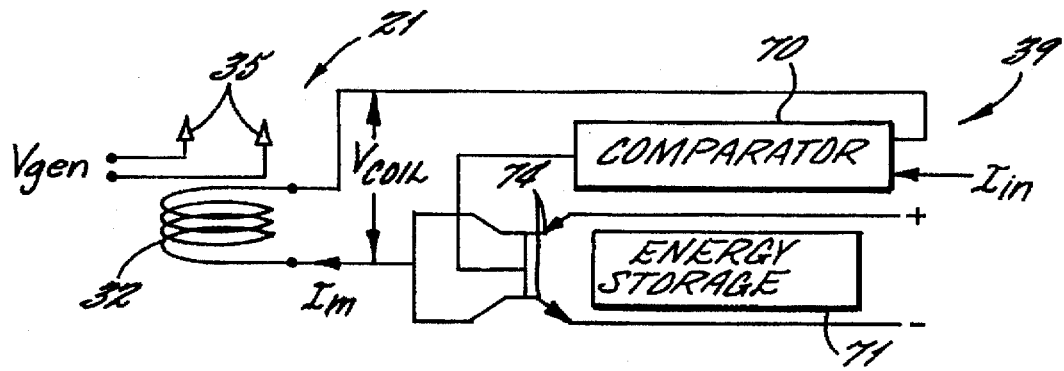
FIG. 5 is a schematic block diagram of a coil excitation circuit according to the invention.
Figure 6:
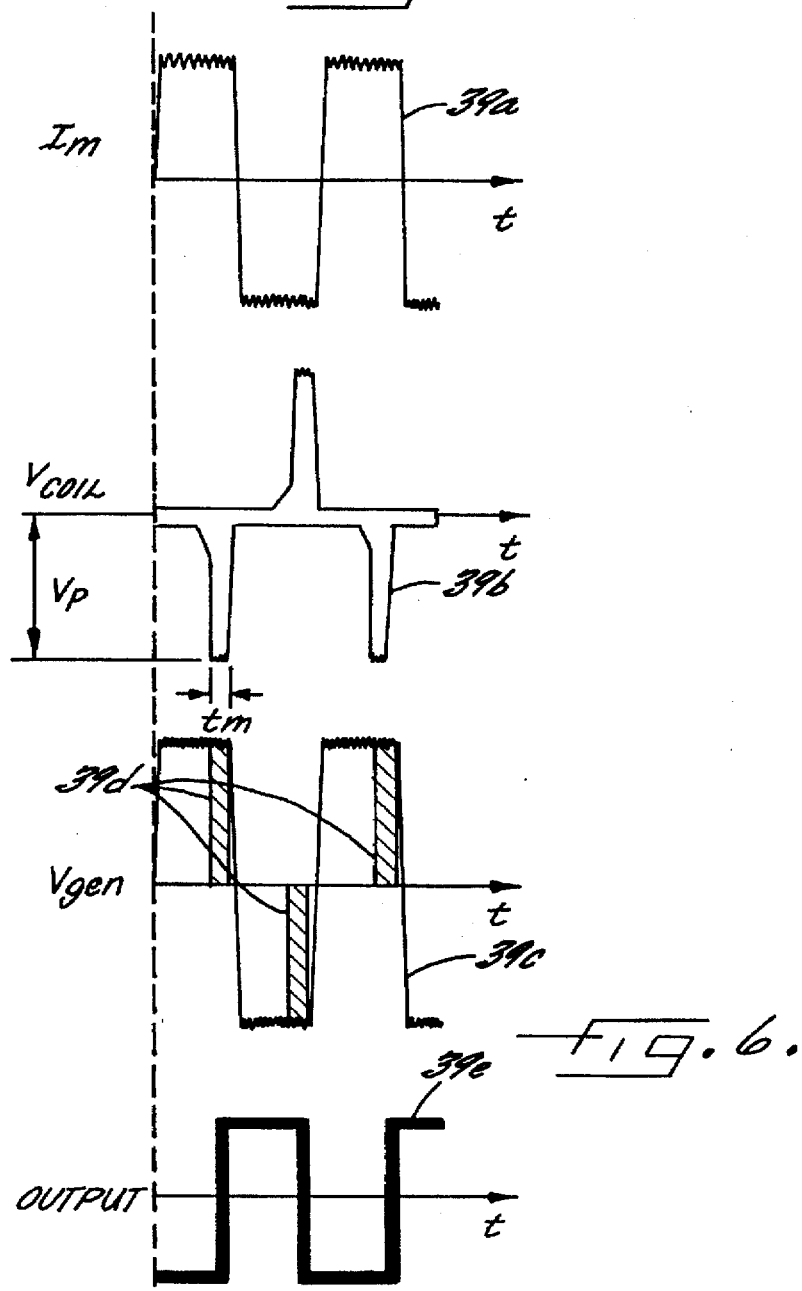
FIG. 6 is a series of plots of various current and voltage waveforms produced by the coil excitation circuit of FIG. 5.

For example, as understood with particular reference to FIGS. 5 and 6, an excitation magnetizing current waveform $I_m$, as illustrated by plot 39a, provides a current of about 0.7 to 1.5 amps peak-to-peak at a frequency in the range of about 5 to 80 Hz that may be delivered by energy managed electronics of the coil excitation circuit 39. More particularly, the energy managed electronics may include the illustrated comparator 70, energy storage circuit 71 and transistors 74 connected as shown in FIG. 5. The energy storage circuit 71 creates a high voltage build-up to thereby produce a higher magnetizing current $I_m$ for a given coil inductance and frequency as would be readily understood by those skilled in the art.

The comparator 70 superimposes high frequency pulses on the order of 10 KHz to the magnetizing current $I_m$ further resulting in a rapidly oscillating coil voltage $V_{coil}$ as shown by the plot 39b of the envelope of the coil voltage as would be readily understood by those skilled in the art. The coil voltage may have a peak $V_p$ of about 70 volts, and while the voltage peaks for only a relatively small portion of the waveform on the order of a few milliseconds $t_m$ as understood with reference to FIG. 6. The excitation of the coil 32 produces a signal $V_{gem}$ at the electrodes 35 as shown by the square wave plot 39c. The signal $V_{gen}$ is sampled or measured at predetermined time windows 39d to produce the output signal as shown by the plot 39e. Accordingly, an advantage of the present invention is that the magnetizing current $I_m$ is preferably greater than or equal to about 0.7 amps, while the power consumption of the coil 32 is preferably in the range of about 1 to 6 volt amps. The excitation of the coil 32 produces little excess heat so that the power consumption is less than 8 VA per sensor including the electronics 39, and as would be readily understood by those skilled in the art. In contrast, a typical conventional sensor consumes at least 10 VA or more for acceptable accuracy.

The relatively low power consumption of the sensor 21 of the invention produces a negligible temperature rise and consequently allows the lightweight coils 32 to be permanently encapsulated in stiff setting epoxy resin, plastics or other cold or thermosetting potting material 42 within the housing 34. The encapsulation or potting material 42 prevents on-site vibration or shocks from causing disruptive relative movement of the coil 32, electrodes, cabling and other components within housing 34. Hence, the likelihood of vibration and shock errors is significantly reduced compared to conventional magnetic flow sensors.

An additional sensor 28 may also extend through an opening in the wall of the conduit 25, such as for measuring or sensing one of a number of other parameters or characteristics related to the liquid within the conduit. For example, the additional sensor 28 may be one of a pH sensor, a salinity sensor, an oxidation reduction potential sensor, a dissolved oxygen sensor, and a turbidity sensor. Other or multiple additional sensors are also contemplated by the present invention. Moreover, because the present invention does not require an electrically insulating liner on the wetted surfaces, the additional sensor 3B may be readily positioned to extend through the wall of the conduit 25. The additional sensor 28 may be operatively connected to cooperate with the illustrated processor 30 as would be readily understood by those skilled in the art.

The region or area 19 defined between locations 18a, 18b on the conduit and extending into the interior of the conduit has a relatively weak magnetic field. For example, the magnetic field adjacent the electrodes 35 may typically be greater than about 10 milligauss for the coil excitation described above. The region 19, in contrast, may have a magnetic field strength of less than about 1 milligauss. The sensor 28 may be positioned in a longitudinal extending arcuate portion of the conduit 25 in a range of about 70 to 110 degrees of rotation from an imaginary line extending longitudinally through a center of the flow sensor 21 and its associated mounting opening. More preferably, the additional sensor 28 may be positioned in a longitudinal extending portion of the conduit 25 at about 90 degrees of rotation from the center of the sensor 21. In other words, the electromagnetic coil 32 and the relative positioning of the opening in the conduit for mounting the additional sensor 28 with respect to the electromagnetic coil 32 produces a relatively weak magnetic field in the region 19 adjacent the additional sensor 28.

The additional sensor 28 may be a sensor susceptible to magnetic fields, such as a turbidity sensor and a dissolved oxygen sensor, as would be readily understood by those skilled in the art. Accordingly, placement in the relatively low magnetic field region 19 decreases the likelihood of undesirable noise being imparted to the sensor 28, while permitting positioning proximate the liquid flow sensors 21 and along the spool piece or conduit 25.

The liquid flow sensors 21 may be positioned in a medial portion of the conduit 25 as illustrated. Accordingly, to provide additional longitudinal separation and further reduce the magnetic field, the additional characteristic sensor 28 is preferably positioned adjacent an end of the conduit 25 as shown in the illustrated embodiment. The conduit 25 may desirably carry all of the sensors needed for the application in a compact and easy to install assembly. Multiple characteristic sensors 28 may be carried by the conduit 25 as would be readily understood by those skilled in the art.

The pair of opposing electrodes 35 are positioned on opposite sides on the liquid contacting portion defined by the covering 37 of the sensor housing 34. The liquid contacting portion includes an inclined or downwardly sloping annular portion 34a surrounding a central pressure sensing diaphragm 45. The electrodes 35 of the liquid flow sensor 21 are also positioned generally flush with an imaginary cylindrical surface defined by an interior of the conduit 25. The electrodes 35 contact the flowing media or liquid and generate an electrical signal representative of the rate of flow of the liquid. In particular, Faraday's Law states mathematically: Vgenerated=B vd, where Vgenerated is the voltage signal across the electrodes (typically in millivolts), B is the strength of magnetic field (typically in millivolts seconds/ft$^2$), v is the mean velocity of media (typically in feet per second), and d is the distance between electrodes (typically in feet). Accordingly, the relatively large spacing between electrodes 35 provides a stronger output signal in accordance with Faraday's Law.

Yet another advantage of the present invention is that the output signal may be a linear logarithmic function in terms of pulses per unit volume (ppg) versus flow rate (Q) as given by:

ppg=kQ$^{-n}$, where n and k are determined by calibration. Accordingly, by linearization of log (ppg) =−n log$_{10}$ Q+log$_{10}$ k, a relatively wide and linear range is provided for typical mean velocities of 0.1 to 40 feet per second in conduits 25 having a diameter of two inches or greater. In particular, the bipolar voltage signal from the electrodes 35 may be converted into a standard 4 to 20 milliamp output and then converted into pulses for a given volume of liquid flow. As would be readily understood by those skilled in the art the pulses are readily linearized as described above based upon flow rate. The linearization and associated calculations may be readily implemented by the processor 30 as would also be readily understood by those skilled in the art.

A conductivity or level switch 57 may be mounted at an angle through the sidewall of the conduit 25 dependent on the amount of gas allowable at the top of conduit when mounted horizontally. In addition, the pair of sensors 21 may be positioned in vertical relationship so that the level switch 57 may be used to switch off an uppermost sensor, as well as control a pump or an alarm as would be readily understood by those skilled in the art. The level and mean velocity measurements may be multiplied and linearized as necessary to provide volumetric flow.

A conventional magnetic flow sensor does not readily lend itself to measure parameters, other than flow, from within the sensor unit itself or from the conduit or spool piece in which the sensor is mounted. For example, a non-full pipe flow measurement using a conventional sensor may not be accurate since liquid level measurement cannot readily be accurately accomplished at the location of the electrodes of the conventional sensor.

Figure 3:
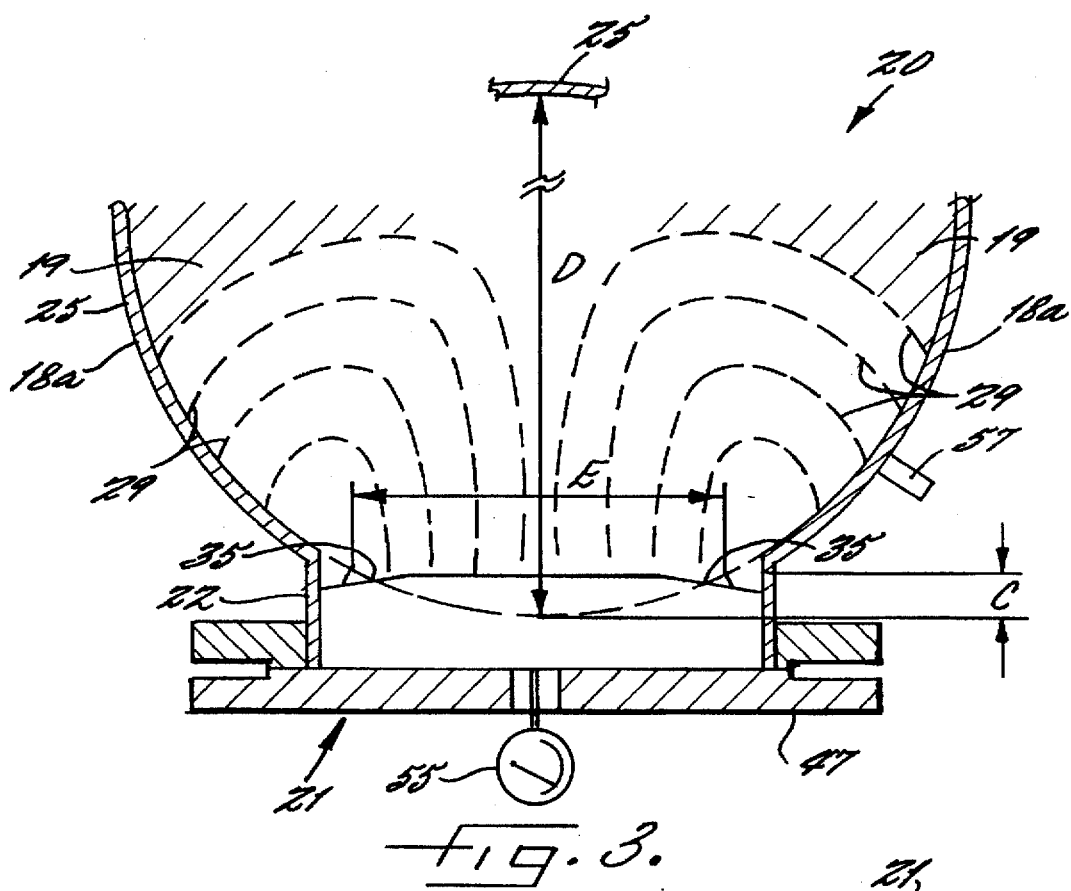
FIG. 3 is an enlarged cross-section view of a portion of the apparatus as shown in FIG. 2 rotated ninety degrees clockwise.
Figure 4:
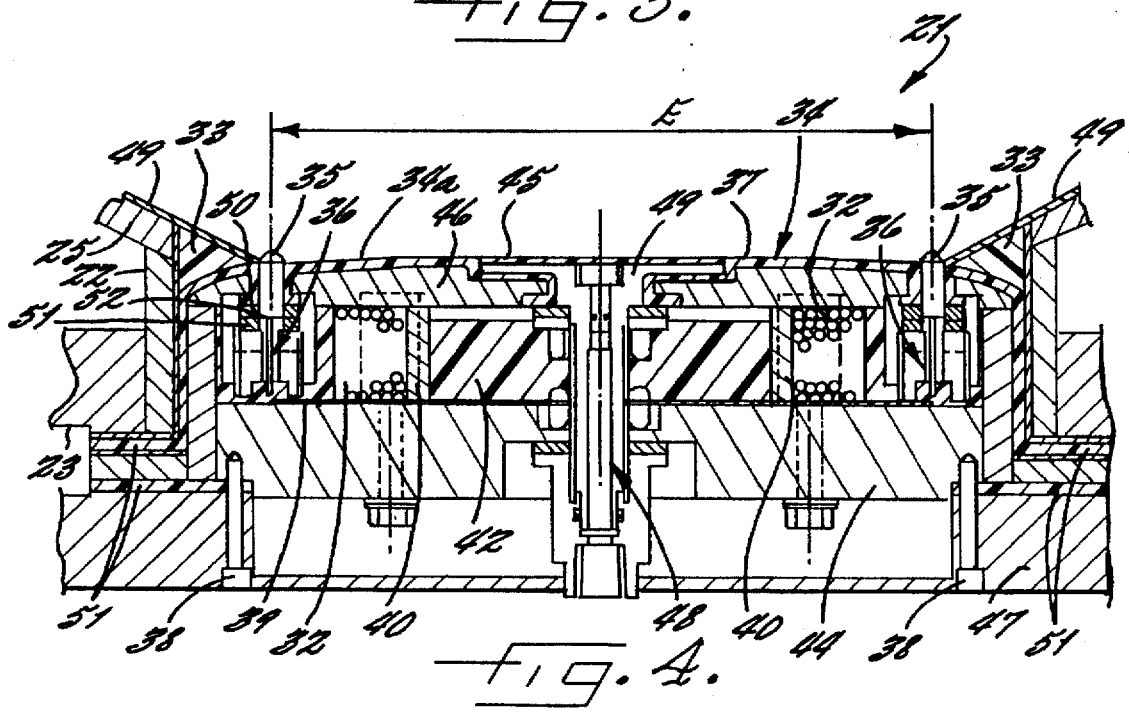
FIG. 4 is an enlarged cross-sectional view of an embodiment of the liquid flow sensor of the present invention.

Turning now more specifically to FIG. 3, another key feature of the invention is that the electrodes 35 are preferably fairly largely spaced apart by distance E relative to their depth of penetration C into the conduit. The distance E is also a factor in determining the size of the coil 32 so that the larger the distance E the larger the diameter of the coil 32 may be made, thereby producing a wider magnetic field. The ratio of E/C is desirably above a predetermined value, such as 2 to 1, and more preferably above 3 to 1, to enhance accuracy. The electrode spacing E is preferably greater than 10% of the diameter of the conduit 25. More particularly, it has been found that for a conduit 25 diameter of less than about 36 inches, the electrode separation distance E is preferably not less than about 20% of the diameter D. For a conduit diameter D greater than about 36 inches, but still less than 80 inches, E is preferably not less than 10% of the diameter.

Increased accuracy is provided by the relatively large ratio of the distance between the electrodes E compared to the chordal depth C of the sensor 21, along with the enhanced magnetic field, in turn, derived from a relatively high magnetizing current and frequency along with the magnetically permeable material of the conduit 25.

Another aspect of the invention is that the depth of sensor penetration into the interior of the pipe helps to change the flow profile of the media to be more regular. The minimum ratio of E/C adequately conditions irregular velocity flow profiles to provide greater accuracy. In addition, the depth of penetration C is also preferably not more than about 10% of the diameter D. These relationships are advantageous in assuring high accuracy with a relatively compact sensor 21.

The minimum ratio of E/C of greater than 2/1 still allows virtually unrestricted free flow of liquid in the spool piece or conduit 25 and with negligible pressure loss. The ratio also improves irregularities occurring in velocity profiles due to potentially unfavorable upstream and downstream mating pipe configurations.

It is recognized that one of the largest sources of error experienced by conventional flow sensors is related to relatively weak magnetic field strength and its distribution within the area of flow. That coupled with unfavorable upstream and downstream mating pipe conditions, such as pipe bends, means that conventional sensors often compromise the accuracy of the true weighted signal across the electrodes to infer volumetric flow. The apparatus 20 and sensors 21 according to the invention overcome these shortcomings of conventional sensors.

Returning again now more particularly to FIG. 4, the sensor 21 includes a pressure plate 44 to ensure that the sensor is correctly supported to withstand static pressures within the spool piece 22. The illustrated sensor 21 also includes a central pressure sensing diaphragm 45 connected in fluid communication with a pressure sensing transducer 55. Accordingly, the invention may be used to determine if the pipe or conduit 25 is less than full, or to determine the pressure within a full pipe.

The relatively large separation distance of the electrodes 35 and the relatively large diameter of the coil 32 permits a relatively large pressure or level sensing diaphragm 45 and associated components to be fitted at the center of the sensor 21. The pressure sensing diaphragm 45 may preferably be manufactured from media compatible material, and more preferably, electrically conductive material to permit the diaphragm to serve as a ground electrode. The diaphragm 45 may be coupled to a pressure sensing assembly 48 positioned within an internal cavity 49 which, in turn, may be oil filled to communicate with a remote or integral pressure/level transducer or gauge 55 as would be readily understood by those skilled in the art. The pressure sensing assembly 48 may also be replaced by an integrally fitted pressure/level transducer or by an electrode for electrical grounding, as would also be readily understood by those skilled in the art.

In other words, the apparatus 20 may include pressure sensing means provided by a transducer operatively connected to the pressure responsive diaphragm 45 for generating a signal relating to liquid pressure. The pressure sensing means may also include indicator means for providing an indication of at least one of liquid pressure if the conduit is full, and liquid level if the conduit is less than full or has an open upper portion. For example, a standard pressure gauge 55 may be connected in fluid communication with the cavity adjacent the pressure responsive diaphragm. Alternately, a transducer may deliver its output signal to the processor 30 to facilitate computation of the volumetric liquid flow. Accordingly, a compact and reliable sensor for both liquid flow rate and liquid pressure is provided by the present invention.

A filler material 33 or part of the mold of a liner may be positioned adjacent the outer edges of the electrodes 35. As would be readily understood by those skilled in the art, the conduit 25 may include a liner 49 suitable for use with potable water or for compatibility with corrosive media, for example. However, the liner 49 may be damaged without affecting measurement accuracy for the sensor 21. In contrast, in a conventional sensor any damage to the liner is likely to detrimentally affect performance. In other words, even when a liner 49 is used in the apparatus 20 of the present invention, it is not critical that the media be kept from penetrating between the conduit 25 and the liner 49.

The illustrated sensor 21 includes a molded covering 37 which surrounds the electrodes 35 and extends into the recess adjacent the electrode 35 for efficient high pressure sealing. In other embodiments of the sensor, the covering 20 may not be needed, such as where plastic or other electrical insulation material, such as PVC, is used to define the liquid contacting portion of the sensor. A body 46 of material, such as plastic, non-magnetic stainless steel or aluminum, may underlie the illustrated insulating covering 37.

Two separate seals 50, 51 trap a shim 52 therebetween for the electrode 35. The shim 52 is preferably welded to the electrode 35. The electrodes 35 and the seals 50, 51 are preferably made from media compatible material as would be readily understood by those skilled in the art. The electrodes 35 may also be used for measurement of velocity, electrical conductivity, or media salinity, for example, in addition to sensing flow rate, as would also be readily understood by those skilled in the art.

A core 40 of carbon steel or sintered soft iron particles is preferably contained in electrically insulated bags as would be readily understood by those skilled in the art. The core 40 links the magnetic field with the adjacent conduit portions. The core 40 also preferably defines a gap of about ⅛ inch with the coil 32. Such a construction of core 40 improves the efficiency of penetrating the media with magnetic flux, and reduces detrimental effects of eddy currents.

Grounding screws 38 are provide that all in that all internal electrical grounding components have the same electrical potential to the outer flange 23 and the conduit 25. In addition, an electrical grounding plate 39 is also provided for grounding the pressure/level diaphragm assembly to all other internal electrical grounding. Various seals 51, such as of rubber or Kalrez may be used in the sensor 21 as shown in the illustrated embodiment.

Figure 7:
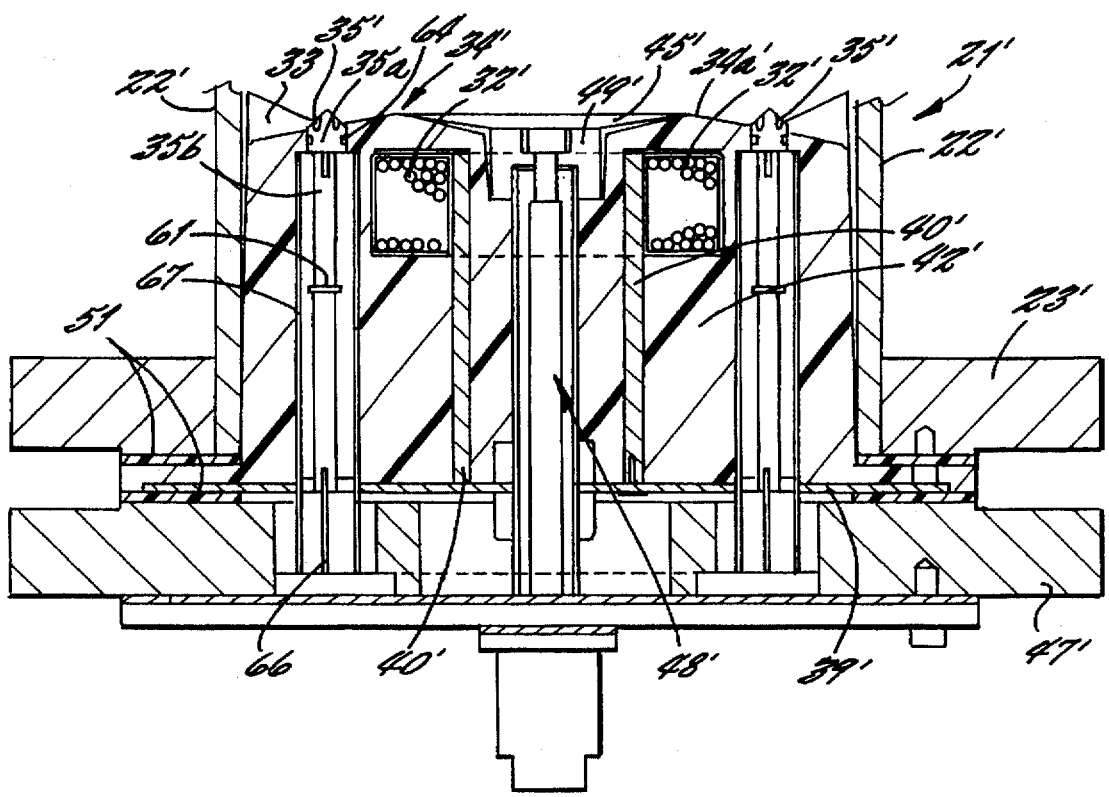
FIG. 7 is a cross-sectional view of another embodiment of a liquid flow sensor of the present invention.
Figure 8:
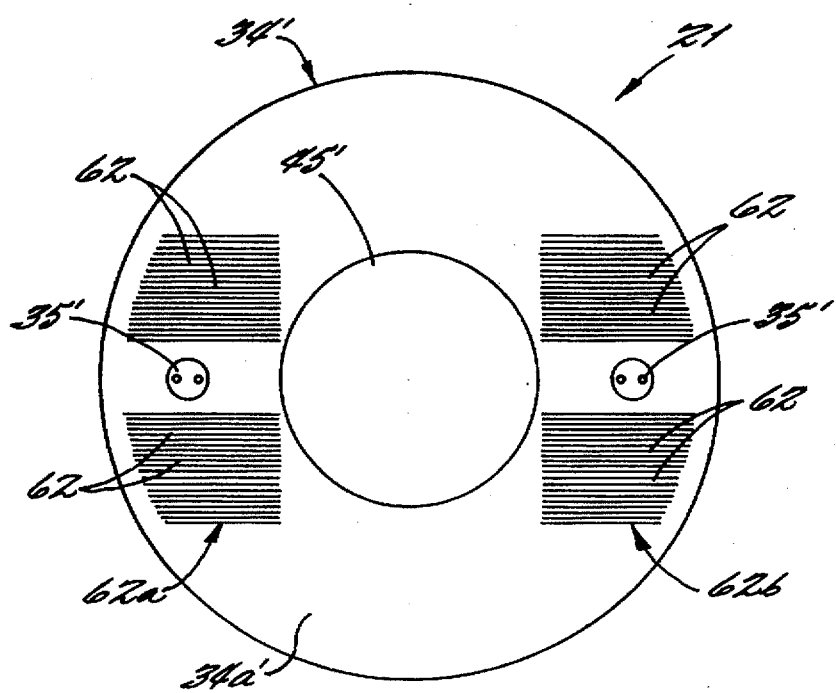
FIG. 8 is a top plan view of the sensor embodiment shown in FIG. 7.

Turning now additionally to FIGS. 7 and 8, another embodiment of the sensor 21' is described. In this embodiment, the liner has been omitted as the liner is optional according to an advantage of the present invention. The plastic body 46 and pressure plate 44 have also been omitted. The function of the pressure plate is provided by the illustrated flange 47'. The mold material 42' that encapsulates the electrodes 35', pressure/level sensing assembly 48', coil 32', core 40' and other components may be cold setting or thermosetting synthetic material, such as epoxy resin, Polyurethane, PFA, or similar materials as will be readily appreciated by those skilled in the art.

The outer flange 47 being an integral part of sensor 21' may be bolted to the standpipe flange 23' with a predetermined torque. This feature of the invention, together with normal control of manufacturing tolerances and other features as described above allows interchangeability of the sensor with the conduit 25 on-site without typically requiring a change in sensor calibration. This configuration also allows the thickness of sensor 21' to be relatively slim, that is, typically less than 1½". The slim shape is important particularly when the sensor 21' is used in open channels as discussed in greater detail below.

Each electrode 35' may be provided by an electrode tip 35a which is screwed into an electrode extension 35b normally after molding of the mold or potting material 42'. The tip or outermost portion of the electrodes 35' are desirably positioned to extend outwardly beyond the adjacent downwardly sloping annular housing portion 34a' as shown perhaps best in FIG. 7. Moreover, the outermost electrode portions are preferably substantially flush with an imaginary plane defined by the central portion of the housing provided by the illustrated pressure sensing diaphragm 45'.

An O-ring seal 64 may be provided as shown in the illustrated embodiment. Rotation of electrode extension 35b is prevented by a pin 65 protruding from the electrode extension into the hard set mold or potting material 42'. A connecting wire may be attached to the electrode connection pin 66. A cylindrical electrode screen 67 shields the electrode extensions 35b from electrical interference that may be generated by the electromagnetic coil 32'.

Figure 9:
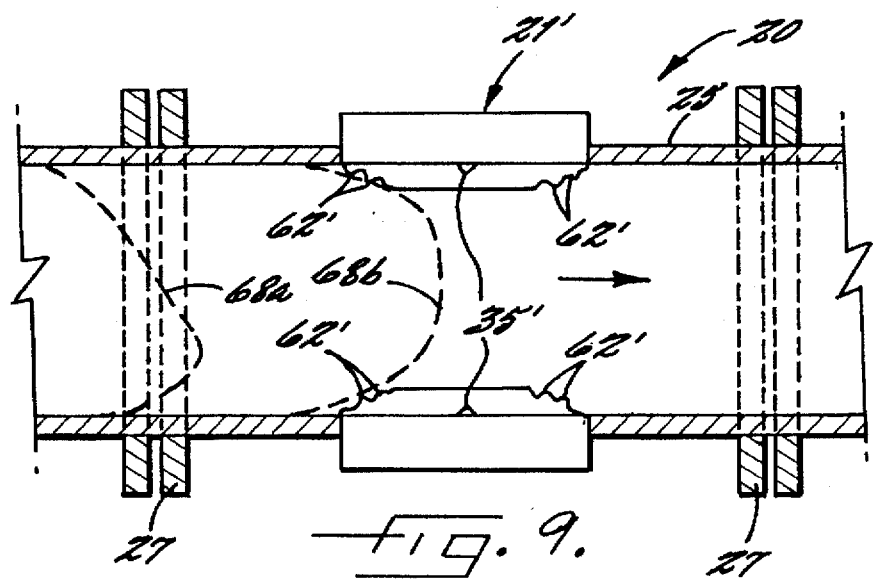
FIG. 9 is a longitudinal cross-sectional cross-section view of the apparatus installed in fluid communication with adjacent conduit sections and illustrating the velocity profile conditioning of the invention.
Figure 10:
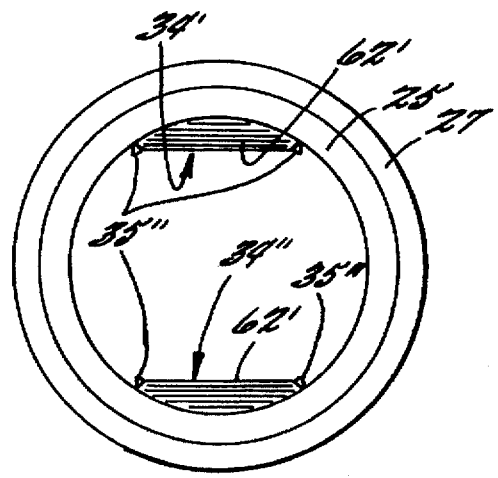
FIG. 10 is an end view into the apparatus as shown in FIG. 9.

As shown in FIGS. 8–10, a further reason that measurement accuracy is enhanced at relatively low velocities typically less than two feet per second is that small transversely extending ridges or serrations 62 may be provided in the curved or sloping profile at each end of the sensor 21'. The serrations 62 provide velocity profile enhancing means for increasing the effective Reynolds Number at the liquid contacting portion of the sensor housing 34'. The serrations 62 may define a sawtooth cross-sectional shape and may be about 1/16"×1/16"×45°. The serrations 62 may have a vertical height in the range of about 1/16 to ⅜ inches. The serrations 62 may be formed by molding or a subsequent cutting or forming operation as would be readily understood by those skilled in the art. The serrations 62 may also be molded or formed into the filler 33' adjacent the edges of the opening in the conduit, as well as the area in the area around the electrodes 35'.

As shown in FIG. 8, the serrations 62 extend parallel to a direction defined by the electrodes 35'. The serrations 62 are also illustratively arranged in two bands 62a, 62b extending adjacent opposite side edges of the liquid contacting portion of the sensor housing 34'. Each band 62a, 62b includes a gap in the ridges or serrations adjacent the respective electrodes 35'. As shown in FIGS. 9 and 10, the serrations 62' may extend across the entire liquid contacting portion 34" of a sensor, particularly for relatively small diameter conduits 25'. Other configurations of projections to increase the Reynolds number adjacent the electrodes 35' are also contemplated by the invention as would be readily understood by those skilled in the art.

The serrations 62 cooperate with the geometric relationships described above including the curved profile and particularly the ratio of E/C or E/W to condition an irregular velocity profile 68a into a more regular profile 68b in the area adjacent the pair of illustrated sensors 21' as shown perhaps best in the schematic views of FIGS. 9 and 10. These features together with the strong magnetic field in the liquid produced by the sensor according to the invention provides highly accurate volumetric flow measurements. It is a fundamental advantage that the invention can operate with acceptable accuracy within or near laminar flow regimes, typically at Reynolds Numbers 600–6000, as well as Reynolds Numbers substantially into the turbulent flow regime, typically up to 20 million.

In the embodiment of the apparatus 20 (FIG. 1) including the pair of sensors 21 mounted diametrically opposite each other in a circular cross-sectional carbon steel spool piece or conduit 25, each of the sensors includes a relatively large diameter coil 32 and pair of electrodes 35 of relative large distance apart compared to conventional insertion type sensors. Such a quadruple electrode arrangement with coils virtually parallel to one another and with the liquid contacting portion of the sensors 21 projecting into the conduit a predetermined distance serves to condition an irregular velocity profile and efficiently distribute the magnetic field. This provides accurate determination of the volumetric flow down to mean velocities the same or lower than conventional magnetic flow sensors, but with lower costs of construction and substantially lower velocities and better accuracies than conventional magnetic flow sensors.

Figure 11:
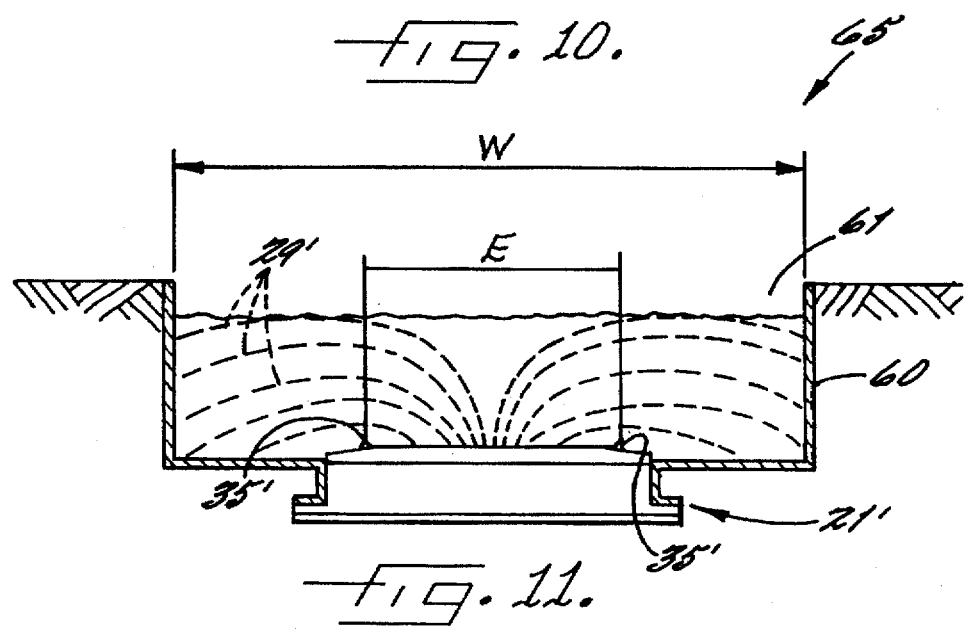
FIG. 11 is a schematic cross-sectional view of the apparatus of the present invention implemented in an open channel.

Referring now additionally to FIG. 11 an open channel embodiment of the apparatus 21" of the invention is described. In this embodiment, a carbon steel cradle or portion of the open channel 60 defines the liquid passageway 61. The illustrated passageway 61 and cradle or channel 60 have a rectangular cross-sectional shape. Those of skill in the art will recognize that other cross-sectional shapes are also contemplated by the invention and that such channels are often formed or installed in the ground as illustrated.

The sensor 21' is connected to the cradle or channel 60 to provide a sufficiently strong magnetic field within the media or liquid. For an open channel configuration with a width W of less than about 80 inches, the separation between electrodes E is preferably between about 95% and 10% of the width. This embodiment of the apparatus 65 may also include the pressure sensing diaphragm and other components as described above with respect to the other invention embodiments as will be readily appreciated by those skilled in the art. In addition, multiple sensors 21' may also be used in an open channel configuration.

Single or multiple sensors 21' may be used in the open channel configuration without the need for a cross-sectional restriction in the flow channel width where the ratio of E/W is as provided above. The distance between electrodes 35' to the width of the open channel is thus sufficiently large that the sensor accurately 21' infers volumetric flow with high accuracy.

In summary, because of the relatively lightweight and compact nature of the sensor 21, 21' according to the invention, a relatively short spool piece or conduit 25 may be used to mate with adjacent conduit sections. In addition, because the sensor 21, 21' may be mounted in a carbon steel spool piece or conduit 25 that does not require lining, the following advantages are possible: end flanges are not necessary and the conduit can be readily joined to adjacent sections; and additional pH, electrical conductivity, salinity, oxygen reduction potential, density, dissolved oxygen, turbidity and similar sensors may be mounted in the same carbon steel spool piece.

The liquid flow sensor 21, 21' according to the invention also provides a demountable, virtually obstruction less magnetic flowmeter which may be readily installed into an existing pipe, venturi, in a pipe fitted carbon steel spool piece, or in a cradle in an open channel or non-full pipe. The sensor 21, 21' uses a relatively large magnetizing current, and low power consumption to provide cost effective improvements over conventional magnetic flow sensors. The mechanical design of the sensor 21, 21' incorporates lightweight coils 32, encapsulated in a stiff setting plastic or resin potting material 42, and while the coils 32 provide a relatively high magnetic field. The sensor 21, 21' incorporates a large ratio of coil diameter and distance across the electrodes 35 compared to the inserted distance when installed. Accordingly, relatively high accuracy is provided by the present invention.

The sensor 21, 21' includes a coil 32 and electrodes 35 in a single module that may be field replaceable and interchangeable with spares and manufactured to tolerances that allow interchangeability with spares, without the need to recalibrate. The sensor 21, 21' may also include an integral grounding electrode or pressure or level sensing diaphragm 45, which acts simultaneously as a grounding electrode, such that external or further means of grounding may not be necessary. The accuracy of the sensor 21, 21' is largely unaffected by cuts or scratches in any insulating liner or coating for the interior of the liquid carrying conduit. The liquid flow sensor 21, 21' may also be included in a relatively low cost said carbon steel conduit.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A liquid sensing apparatus comprising:
    a conduit for carrying a liquid flow, said conduit having an opening in a wall portion thereof; and
    liquid sensor means positioned in the opening in said conduit for sensing liquid flow rate and liquid pressure within said conduit, said liquid sensor means comprising
        a housing comprising a liquid contacting portion extending generally parallel to an axis of said conduit and being positioned to extend into an interior of said conduit, said liquid contacting portion comprising a pressure responsive diaphragm,
        liquid pressure sensing means operatively connected to said pressure responsive diaphragm for sensing liquid pressure,
        an electromagnetic coil positioned in said housing for generating a magnetic field within the liquid flow, and
        a pair of spaced apart electrodes being exposed on the liquid contacting portion for generating a signal related to the liquid flow rate.

2. An apparatus according to claim 1 wherein said liquid pressure sensing means comprises transducer means operatively connected to said pressure responsive diaphragm for generating a signal relating to liquid pressure.

3. An apparatus according to claim 1 wherein said liquid pressure sensing means further comprises indicator means for providing an indication of at least one of liquid pressure if the conduit is full and liquid level if the conduit is less than full or has an open upper portion.

4. An apparatus according to claim 1 wherein said liquid pressure sensing means further comprises cavity defining means for defining a cavity adjacent said pressure responsive diaphragm and within said housing.

5. An apparatus according to claim 4 further comprising a fluid filling the cavity in said housing.

6. An apparatus according to claim 1 wherein said conduit has a cylindrical shape with a circular transverse cross-section.

7. An apparatus according to claim 1 wherein said conduit has an open upper portion so that said conduit defines an open channel.

8. An apparatus according to claim 1 wherein said pair of electrodes are positioned adjacent respective opposite edges of the liquid contacting portion of said housing.

9. An apparatus according to claim 1 wherein said pressure responsive diaphragm is positioned between said pair of electrodes.

10. An apparatus according to claim 1 wherein the liquid contacting portion comprises a generally planar central portion and a downwardly sloping annular portion surrounding the central portion; and wherein said electrodes extend outwardly from the downwardly sloping annular portion.

11. An apparatus according to claim 1 wherein said conduit comprises a magnetically permeable material so that said electromagnetic coil cooperates with the magnetically permeable material of said conduit to generate the magnetic field within the liquid flow.

12. An apparatus according to claim 11 further comprising flux path means within said housing for defining a magnetic flux path from said electromagnetic coil and through adjacent portions of said conduit.

13. An apparatus according to claim 1 further comprising a processor connected to said electrodes for sensing a signal therefrom to determine the liquid flow rate.

14. An apparatus according to claim 1 wherein said pressure responsive diaphragm comprises an electrically conductive material so that said pressure responsive diaphragm serves as a ground electrode.

15. An apparatus according to claim 1 further comprising potting material securing said electromagnetic coil within said housing.

16. An apparatus according to claim 1 further comprising at least one additional sensor extending into the interior of said conduit, and wherein said at least one additional sensor comprises one of a pH sensor, a salinity sensor, an oxidation reduction potential sensor, a dissolved oxygen sensor, and a turbidity sensor.

17. An apparatus according to claim 1 wherein said conduit comprises electrically conductive material for directly contacting the liquid flow.

18. An apparatus according to claim 1 further comprising a liner on an interior of said conduit.

19. An apparatus according to claim 1 wherein said conduit further comprises sensor mounting means positioned adjacent the opening to mount said liquid sensor means.

20. An apparatus according to claim 1 wherein said housing comprises a non-magnetic material.

21. An apparatus for positioning in an opening in a conduit for sensing liquid flow rate and liquid pressure within the conduit, said apparatus comprising:
 a housing comprising a liquid contacting portion for contacting liquid flow within the conduit, said liquid contacting portion comprising a pressure responsive diaphragm;
 an electromagnetic coil positioned in said housing for generating a magnetic field within the liquid flow; and
 a pair of spaced apart electrodes being exposed on the liquid contacting portion for generating a signal related to the liquid flow rate.

22. An apparatus according to claim 21 further comprising liquid pressure sensing means operatively connected to said pressure responsive diaphragm for sensing liquid pressure.

23. An apparatus according to claim 22 wherein said liquid pressure sensing means comprises transducer means operatively connected to said pressure responsive diaphragm for generating a signal relating to liquid pressure.

24. An apparatus according to claim 22 wherein said liquid pressure sensing means further comprises indicator means for providing an indication of at least one of liquid pressure if the conduit is full and liquid level if the conduit is less than full or has an open upper portion.

25. An apparatus according to claim 22 wherein said liquid pressure sensing means further comprises cavity defining means for defining a cavity adjacent said pressure responsive diaphragm and within said housing.

26. An apparatus according to claim 25 further comprising a fluid filling the cavity in said housing.

27. An apparatus according to claim 21 wherein said pair of electrodes are positioned adjacent respective opposite edges of the liquid contacting portion of said housing.

28. An apparatus according to claim 21 wherein said pressure responsive diaphragm is positioned between said pair of electrodes.

29. An apparatus according to claim 21 wherein the liquid contacting portion comprises a generally planar central portion and a downwardly sloping annular portion surrounding the central portion; and wherein said electrodes extend outwardly from the downwardly sloping annular portion.

30. An apparatus according to claim 21 further comprising flux path means within said housing for defining a magnetic flux path from said electromagnetic coil and through adjacent portions of the conduit.

31. An apparatus according to claim 21 further comprising a processor connected to said electrodes for sensing a signal therefrom to determine the liquid flow rate.

32. An apparatus according to claim 21 wherein said pressure responsive diaphragm comprises an electrically conductive material so that said pressure responsive diaphragm serves as a ground electrode.

33. An apparatus for positioning in an opening in a conduit for sensing liquid flow rate and liquid pressure within the conduit, said apparatus comprising:
 a housing comprising a liquid contacting portion for contacting liquid flow within the conduit, said liquid contacting portion comprising a generally planar central portion and a downwardly sloping annular portion surrounding the central portion, the generally planar central portion comprising a pressure responsive diaphragm;
 an electromagnetic coil positioned in said housing for generating a magnetic field within the liquid flow; and
 a pair of spaced apart electrodes being positioned adjacent opposite edges of the downwardly sloping annular portion of the liquid contacting portion for generating a signal related to the liquid flow rate.

34. An apparatus according to claim 33 further comprising liquid pressure sensing means operatively connected to said pressure responsive diaphragm for sensing liquid pressure.

35. An apparatus according to claim 34 wherein said liquid pressure sensing means comprises transducer means operatively connected to said pressure responsive diaphragm for generating a signal relating to liquid pressure.

36. An apparatus according to claim 34 wherein said liquid pressure sensing means further comprises indicator means for providing an indication of at least one of liquid pressure if the conduit is full and liquid level if the conduit is less than full or has an open upper portion.

37. An apparatus according to claim 34 wherein said liquid pressure sensing means further comprises cavity defining means for defining a cavity adjacent said pressure responsive diaphragm and within said housing.

38. An apparatus according to claim 33 further comprising a processor connected to said electrodes for sensing a signal therefrom to determine the liquid flow rate.

39. An apparatus according to claim 33 wherein said pressure responsive diaphragm comprises an electrically conductive material so that said pressure responsive diaphragm serves as a ground electrode.

40. A method for sensing liquid flow rate and liquid pressure within a conduit of a type having an opening in a sidewall thereof, the method comprising the steps of:

positioning a liquid sensor in the opening in the conduit for sensing liquid flow rate and liquid pressure of liquid within the conduit, said liquid sensor comprising a liquid contacting portion including a pressure responsive diaphragm;

generating a magnetic field from the liquid sensor and coupled to the liquid flow; and exposing a pair of spaced apart electrodes on the liquid contacting portion to the liquid flow to generate a signal related to liquid flow rate.

41. A method according to claim 40 further comprising the step of generating a signal relating to liquid pressure based upon the pressure responsive diaphragm.

42. A method according to claim 40 further comprising the step of providing an indication of at least one of liquid pressure if the conduit is full and liquid level if the conduit is less than full or has an open upper portion.

43. A method according to claim 40 wherein the step of exposing the electrodes comprises positioning same on respective opposite edges of the liquid contacting portion.

44. A method according to claim 43 wherein the liquid contacting portion comprises a generally planar central portion and a downwardly sloping annular portion surrounding the central portion; and wherein the step of positioning said electrodes comprises positioning same to extend outwardly from the downwardly sloping annular portion.

45. A method according to claim 40 wherein said pressure responsive diaphragm comprises an electrically conductive material; and further comprising the step of using the pressure responsive diaphragm as a ground electrode.

* * * * *